US010615726B2

(12) United States Patent
Oonishi et al.

(10) Patent No.: US 10,615,726 B2
(45) Date of Patent: Apr. 7, 2020

(54) POWER GENERATION SYSTEM

(71) Applicant: KABUSHIKI KAISHA TOSHIBA, Tokyo (JP)

(72) Inventors: Atsuro Oonishi, Tokyo (JP); Hiroshi Takahashi, Yokohama Kanagawa (JP); Takeshi Ueno, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/900,690

(22) Filed: Feb. 20, 2018

(65) Prior Publication Data
US 2019/0028049 A1  Jan. 24, 2019

(30) Foreign Application Priority Data

Jul. 21, 2017  (JP) .................. 2017-141699

(51) Int. Cl.
*H02P 9/00* (2006.01)
*H02K 11/00* (2016.01)
*H02K 11/26* (2016.01)
*H02K 11/27* (2016.01)
*H02K 11/30* (2016.01)
(Continued)

(52) U.S. Cl.
CPC .......... *H02P 9/006* (2013.01); *H02K 11/0094* (2013.01); *H02K 11/26* (2016.01); *H02K 11/27* (2016.01); *H02K 11/30* (2016.01); *H02K 35/02* (2013.01); *H02P 6/18* (2013.01); *H02P 9/008* (2013.01); *H02P 9/009* (2013.01); *H02P 9/102* (2013.01); *H02P 9/107* (2013.01);
(Continued)

(58) Field of Classification Search
USPC ...... 322/25; 323/280–289; 363/126; 307/24, 307/66
See application file for complete search history.

(56) References Cited

U.S. PATENT DOCUMENTS 4,568,171 A * 2/1986 Ikenoue ............... G03B 27/526
                                                 318/626
5,705,920 A * 1/1998 Watanabe ................. G05F 1/40
                                                 323/285
(Continued)

FOREIGN PATENT DOCUMENTS

EP       2 738 934 A1    6/2014
JP    2001-311452 A    11/2001
(Continued)

OTHER PUBLICATIONS

Nunna et al., "Sensorless Estimation and Nonlinear Control of a Rotational Energy Harvester," Journal of Physics: Conference Series 476 (2013), pp. 1-5.

*Primary Examiner* — Pedro J Cuevas
(74) *Attorney, Agent, or Firm* — Finnegan, Henderson, Farabow, Garrett & Dunner, L.L.P.

(57) ABSTRACT

According to one embodiment, a power generation system includes a power generator, a displacement measuring part, and a converter. The power generator includes a movable part and converts mechanical energy of the movable part into electric power. The displacement measuring part measures a displacement of the movable part. The converter includes a switching circuit whose duty ratio is controlled based on the measured displacement, and converts a voltage level of the electric power.

17 Claims, 18 Drawing Sheets

(51) Int. Cl.

| | |
|---|---|
| *H02K 35/02* | (2006.01) |
| *H02M 3/156* | (2006.01) |
| *H02P 9/10* | (2006.01) |
| *H02P 6/18* | (2016.01) |
| *H02P 23/14* | (2006.01) |
| *H02P 29/032* | (2016.01) |
| *H02P 25/32* | (2006.01) |

(52) U.S. Cl.
CPC ............ *H02P 23/14* (2013.01); *H02P 29/032* (2016.02); *H02M 3/156* (2013.01); *H02P 25/32* (2013.01)

(56) References Cited

U.S. PATENT DOCUMENTS

| | | | | |
|---|---|---|---|---|
| 6,586,943 B1* | 7/2003 | Masuda | ................ | G01D 3/032 324/500 |
| 6,844,739 B2* | 1/2005 | Kasai | ................ | G05F 1/67 323/284 |
| 8,305,058 B2* | 11/2012 | Kim | ................ | G05F 1/67 323/222 |
| 8,384,368 B2* | 2/2013 | Osaka | ................ | H02M 3/156 323/223 |
| 8,609,289 B2* | 12/2013 | Hasegawa | ................ | B60L 3/0023 324/433 |
| 8,922,060 B2* | 12/2014 | Koshin | ................ | H02J 1/102 307/66 |
| 9,142,958 B2* | 9/2015 | Koshin | ................ | H02J 1/10 |
| 9,660,520 B2* | 5/2017 | Perreault | ................ | H02M 1/4208 |
| 9,673,729 B2* | 6/2017 | Perreault | ................ | G05F 1/571 |
| 9,985,439 B2* | 5/2018 | Abido | ................ | H02M 3/005 |
| 9,991,809 B2* | 6/2018 | Kikuchi | ................ | H02M 1/32 |
| 10,075,081 B2* | 9/2018 | Kikuchi | ................ | H02M 3/33523 |
| 10,103,644 B2* | 10/2018 | Khaligh | ................ | H02M 1/4241 |
| 10,262,824 B2* | 4/2019 | Matsuo | ................ | H01H 47/223 |
| 10,411,612 B2* | 9/2019 | Oonishi | ................ | H02M 5/44 |
| 2002/0163323 A1* | 11/2002 | Kasai | ................ | G05F 1/67 323/284 |
| 2003/0164691 A1 | 9/2003 | Ueda et al. | | |
| 2007/0210580 A1 | 9/2007 | Roberts et al. | | |
| 2009/0261796 A1* | 10/2009 | Ito | ................ | B60R 16/03 323/285 |
| 2010/0007319 A1* | 1/2010 | Manabe | ................ | B60L 11/1887 323/285 |
| 2010/0262308 A1 | 10/2010 | Yamada et al. | | |
| 2010/0273072 A1* | 10/2010 | Hasegawa | ................ | B60L 3/0023 429/431 |
| 2012/0086422 A1* | 4/2012 | Ito | ................ | H02M 3/156 323/284 |
| 2012/0091801 A1* | 4/2012 | Koshin | ................ | H02J 1/10 307/24 |
| 2012/0091814 A1* | 4/2012 | Koshin | ................ | H02J 1/102 307/66 |
| 2012/0120696 A1* | 5/2012 | Nishijima | ................ | H02M 1/4208 363/126 |
| 2013/0221753 A1* | 8/2013 | Perreault | ................ | G05F 1/571 307/77 |
| 2014/0327421 A1* | 11/2014 | Arao | ................ | H02M 3/156 323/282 |
| 2015/0288291 A1* | 10/2015 | Han | ................ | H02M 3/337 363/17 |
| 2015/0357912 A1* | 12/2015 | Perreault | ................ | H02M 1/4208 363/126 |
| 2015/0365009 A1 | 12/2015 | Gao et al. | | |
| 2016/0036340 A1* | 2/2016 | Kikuchi | ................ | H02M 1/32 363/21.14 |
| 2016/0099660 A1* | 4/2016 | Khaligh | ................ | H02M 1/4241 363/126 |
| 2016/0261204 A1* | 9/2016 | Kikuchi | ................ | H02M 3/33523 |
| 2016/0276915 A1 | 9/2016 | Oonishi et al. | | |
| 2016/0322830 A1 | 11/2016 | Ramorini et al. | | |
| 2017/0365994 A1* | 12/2017 | Kikuchi | ................ | H05B 37/0227 |
| 2017/0366077 A1 | 12/2017 | Oonishi et al. | | |
| 2018/0278170 A1 | 9/2018 | Oonishi et al. | | |
| 2018/0291516 A1* | 10/2018 | Nakao | ................ | C25B 9/04 |
| 2019/0006949 A1* | 1/2019 | Kikuchi | ................ | H02M 3/33523 |
| 2019/0379227 A1* | 12/2019 | Oonishi | ................ | H02J 7/345 |

FOREIGN PATENT DOCUMENTS

| | | |
|---|---|---|
| JP | 2002-354864 A | 12/2002 |
| JP | 2003-65244 A | 3/2003 |
| JP | 2008-222112 A | 9/2008 |
| JP | 2009-529310 A | 8/2009 |
| JP | 2011-235743 A | 11/2011 |
| JP | 2012-070535 A | 5/2012 |
| JP | 5405127 | 11/2013 |
| JP | 2014-207767 A | 10/2014 |
| JP | 2016-178821 A | 10/2016 |
| JP | 2017-229118 A | 12/2017 |
| JP | 2018-157724 A | 10/2018 |

* cited by examiner

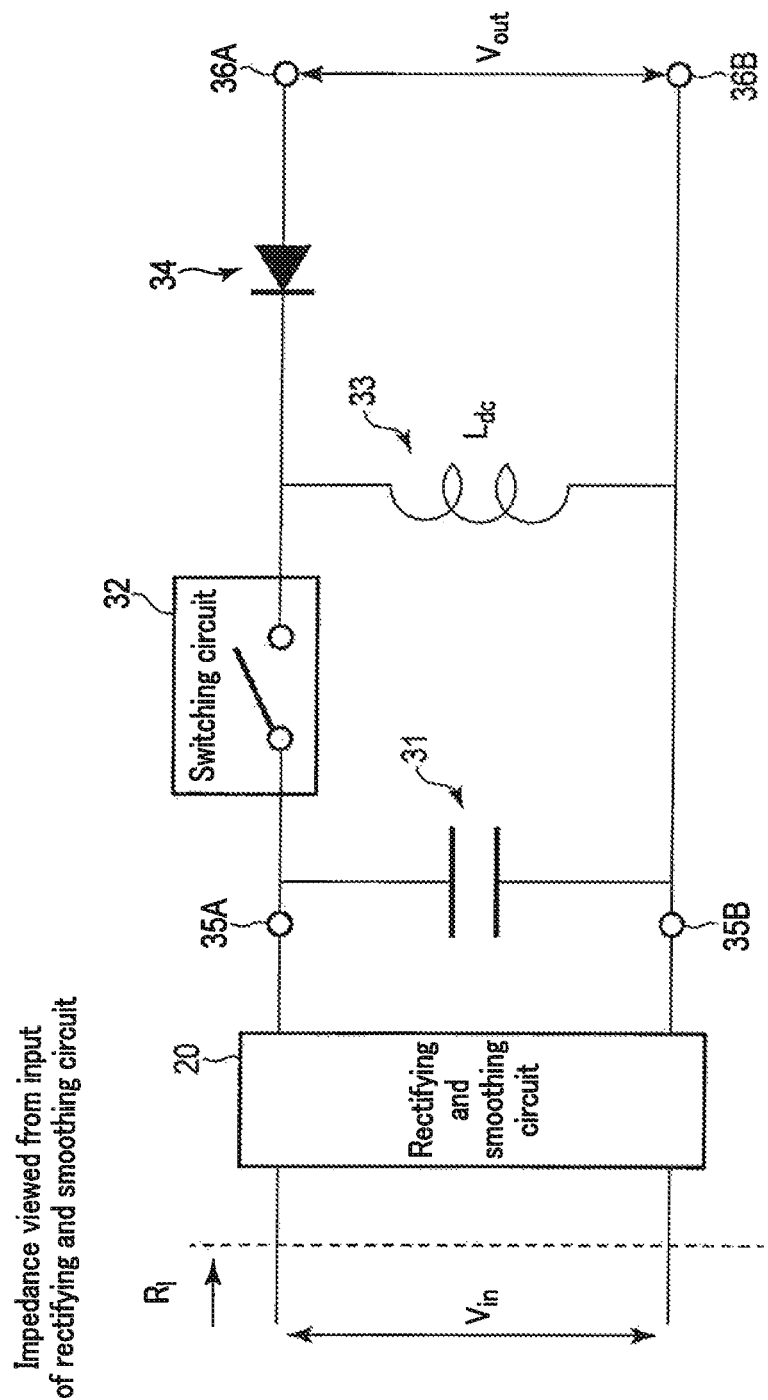
F I G. 3A

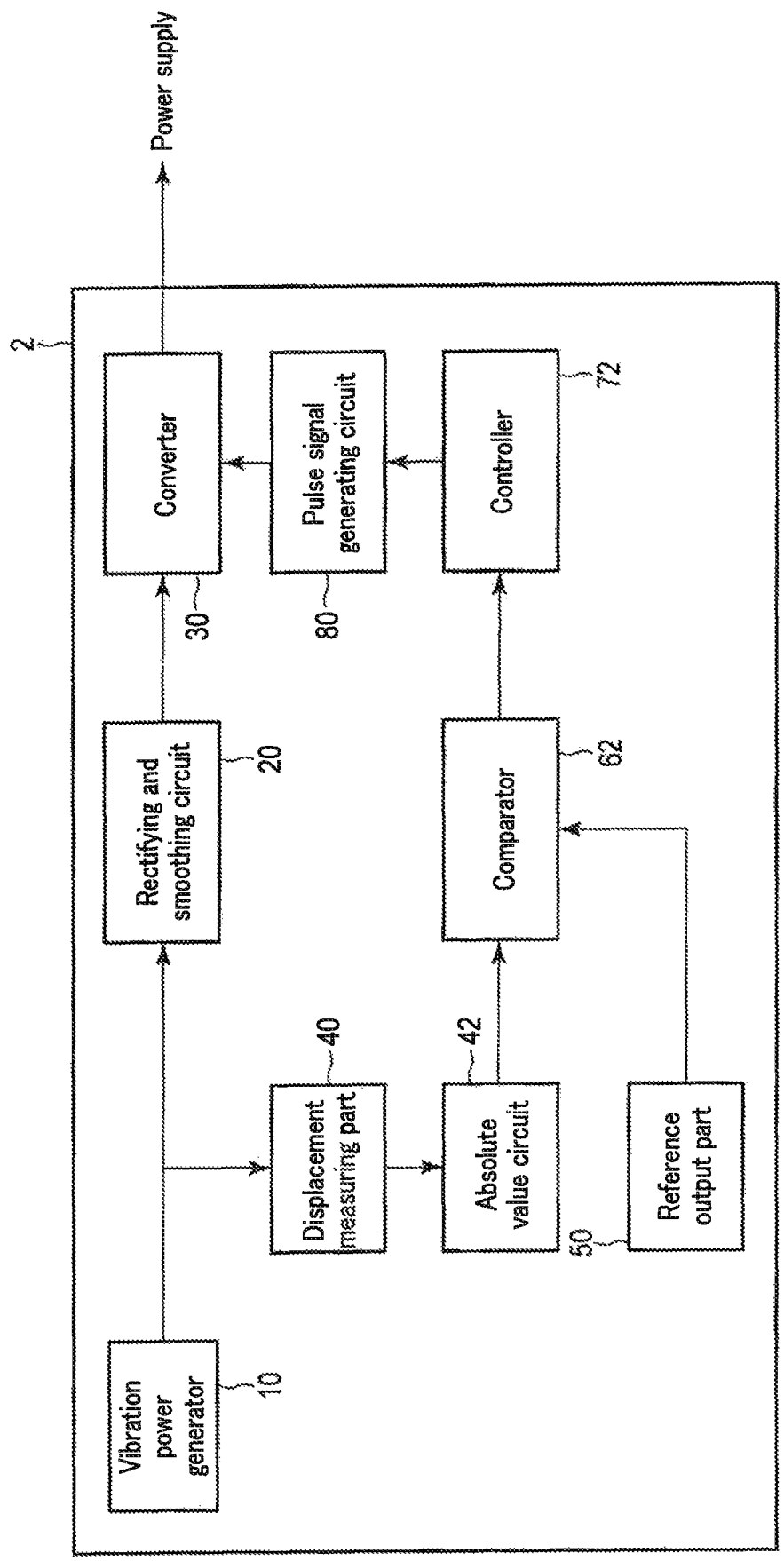
F I G. 8

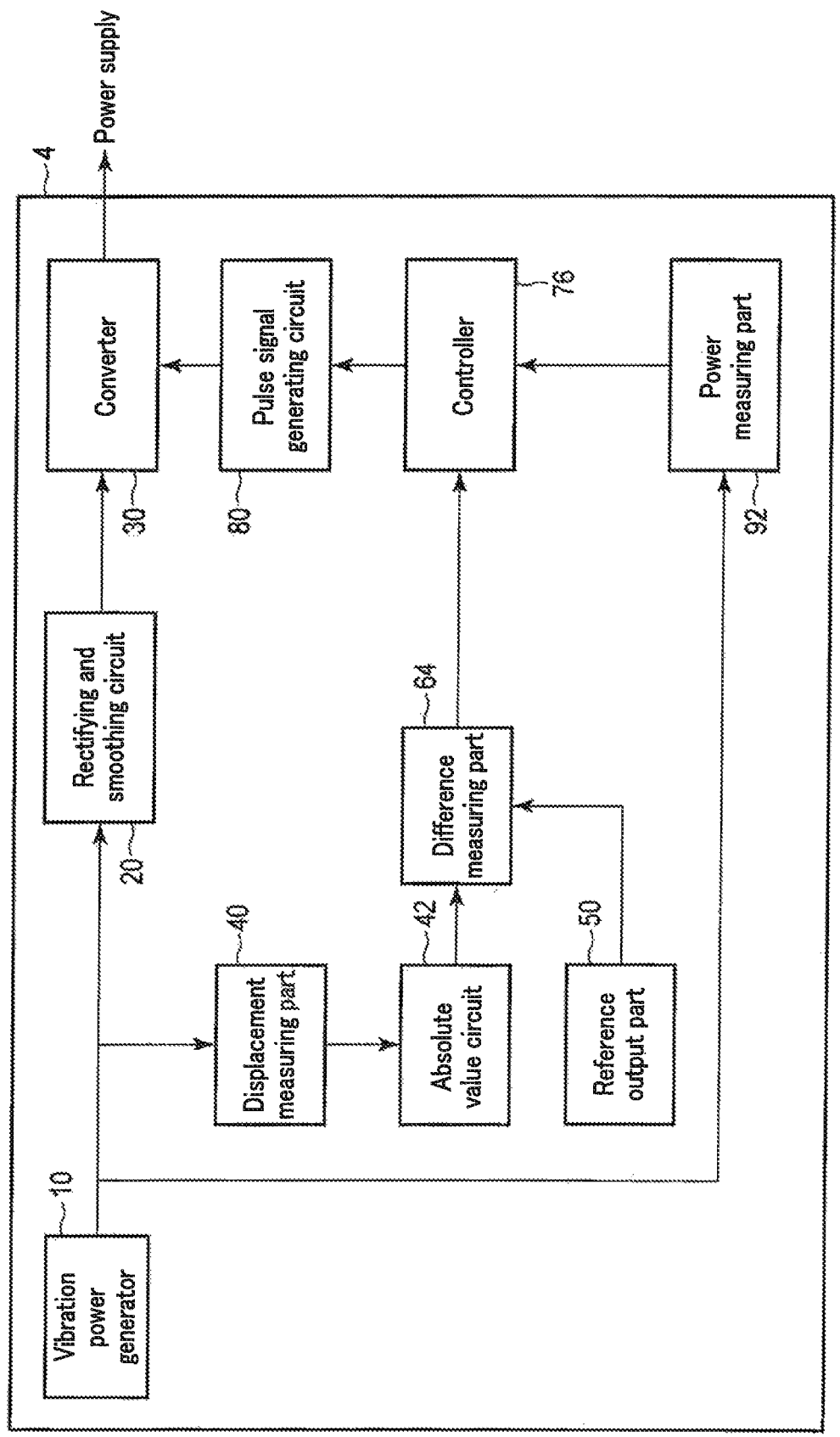
F I G. 18

POWER GENERATION SYSTEM

CROSS-REFERENCE TO RELATED APPLICATIONS

This application is based upon and claims the benefit of priority from Japanese Patent Application No. 2017-141699, filed Jul. 21, 2017, the entire contents of which are incorporated herein by reference.

FIELD

Embodiments described herein relate generally to a power generation system.

BACKGROUND

A vibration power generator converts the kinetic energy from ambient vibration into electric energy, which is suitable for the power supply for wireless sensors. The vibration power generator includes a movable part whose displacement amplitude changes according to the magnitude of ambient vibration. When the displacement amplitude is too large, the movable part may collide with a stationary part, causing a malfunction of the vibration power generator.

BRIEF DESCRIPTION OF THE DRAWINGS

FIG. 3A shows an example of a converter shown in FIG. 1.

FIG. 8 is a block diagram showing a power generation system according to a second embodiment.

FIG. 18 is a block diagram showing a power generation system according to a fourth embodiment.

DETAILED DESCRIPTION

Figure 1:
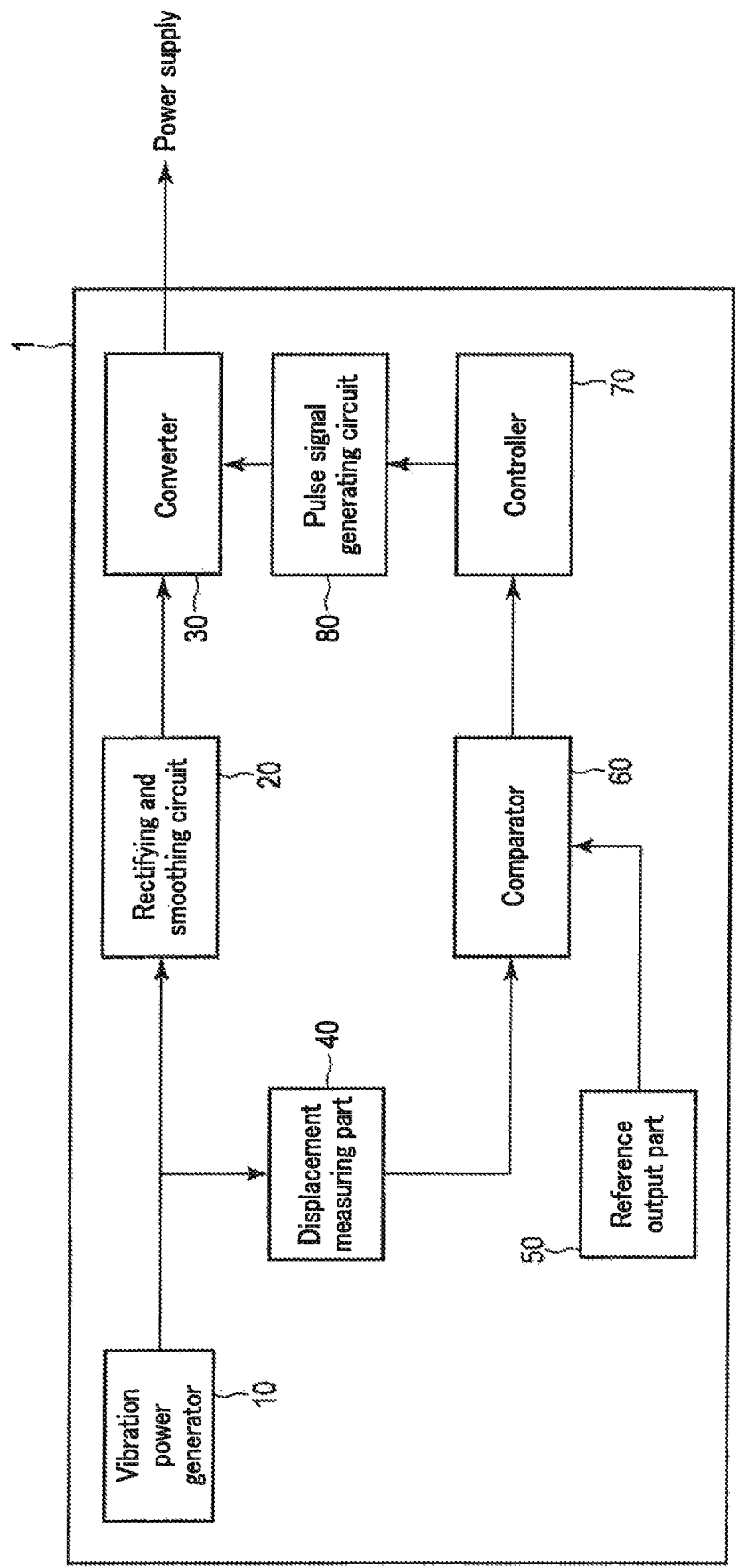
FIG. 1 is a block diagram showing a power generation system according to a first embodiment.

According to one embodiment, a power generation system includes a power generator, a displacement measuring part, and a converter. The power generator includes a movable part and converts mechanical energy of the movable part into electric power. The displacement measuring part measures a displacement of the movable part. The converter includes a switching circuit whose duty ratio is controlled based on the measured displacement, and converts a voltage level of the electric power.

Hereinafter, various embodiments will be described with reference to the accompanying drawings. In the embodiments set forth below, the like elements will be denoted by the like reference numerals, and redundant descriptions will be omitted where appropriate. The drawings provide schematic or conceptual views.

[First Embodiment]

FIG. 1 is a block diagram showing a power generation system 1 according to the first embodiment. As shown in FIG. 1, the power generation system 1 includes a vibration power generator 10, a rectifying and smoothing circuit 20, a converter 30, a displacement measuring part 40, a reference output part 50, a comparator 60, a controller 70, and a pulse signal generating circuit 80.

The vibration power generator 10 converts energy of vibration into alternating-current power. The vibration power generator 10 is an example of a power generator that converts mechanical energy into alternating-current power and is usable in the power generation system 1.

Figure 2:
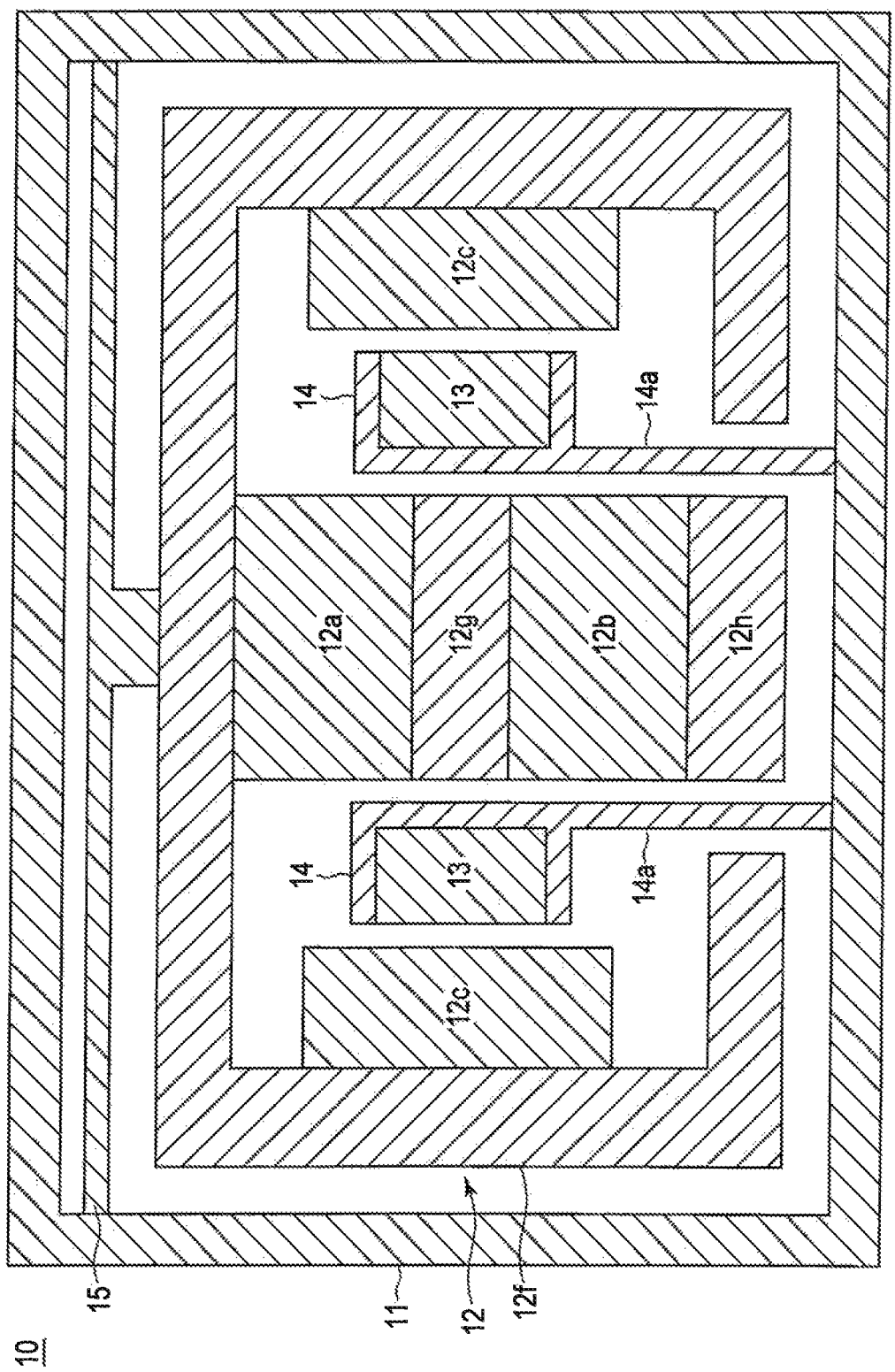
FIG. 2 is a cross-sectional view showing a structural example of a vibration, power generator shown in FIG. 1.

The vibration power generator 10 will be explained with reference to FIG. 2. FIG. 2 is a cross-sectional view showing a structural example of the vibration power generator 10. As shown in FIG. 2, the vibration power generator 10 includes a case (housing) 11, a movable part 12, a coil 13, a fixing member 14, and an elastic member 15.

The movable part 12 is fixed to the elastic member 15 and is hung in the case 11. The movable part 12 includes magnets 12a, 12b, and 12c, and yokes 12f, 12g, and 12h. The yoke 12f is formed in a hollow, substantially cylindrical shape, and surrounds the magnets 12a, 12b, and 12c and the yokes 12g and 12h. The upper center of the yoke 12f is connected to the elastic member 15. The magnet 12a, the yoke 12g, the magnet 12b, and the yoke 12h are sequentially arranged on an upper internal surface of the yoke 12f along its central axis. Each of the magnets 12a and 12b has a north pole on the side of the yoke 12g. Consequently, magnetic fluxes are generated from the magnets 12a and 12b so as to repel each other. The magnet 12c is formed in, for example, a cylindrical shape, and is arranged on an internal surface of the yoke 12f at a distance from the external side of the coil 13. The magnet 12c has a south pole facing the coil 13 and a north pole contacting the internal surface of the yoke 12f.

The coil 13 is formed in an annular shape, and is arranged outside the magnets 12a and 12b and inside the magnet 12c.

The coil 13 is wound in a circumferential direction, and its central axis matches with the central axis of the movable part 12 or case 11.

The fixing member 14 fixes the coil 13 inside the movable part 12. The fixing member 14 includes a columnar supporting member 14a fixed to a bottom surface of the case 11. The fixing member 14 is fixed to the case 11 by the supporting member 14a, and is not fixed to the movable part 12 (i.e., the magnets 12a-12c and the yokes 12g and 12h).

The elastic member 15 is formed in the shape of a disk, in such a manner that its side surface is fixed to the internal surface of the case 11 and a part of its lower surface is connected to the movable part 12.

When ambient vibrations are applied to the vibration power generator 10 with the above-described structure, the coil 13 vibrates integrally with the case 11. The movable part 12 oscillates at a specific frequency with respect to the coil 13, in accordance with an elastic force of the elastic member 15. Consequently, the movable part 12 makes a relative movement in the axial direction with respect to the coil 13, and the magnetic flux that is interlinked with the coil 13 changes with time. Accordingly, an electromotive force is generated by electromagnetic-induction.

As described above, the ambient vibrations (mechanical energy) applied to the vibration power generator 10 are converted into alternating-current power. In the example shown in FIG. 2, magnets 12a, 12b, and 12c and yokes 12f, 12g, and 12h are arranged in the movable part 12, and the coil 13 is arranged in the case 11, which corresponds to a stationary part. Alternatively, the coil 13 may be arranged in the movable part 12, and the magnets 12a, 12b, and 12c and the yokes 12f, 12g and 12h may be arranged in the case 11. Also, the vibration power generator 10 directly converts vibrations (upward and downward movements in the drawing) into alternating-current power in the above-described example; however, the vibrations may be converted into rotational movements and then converted into alternating-current power.

Referring back to FIG. 1, the rectifying and smoothing circuit 20 converts the alternating-current power output from the vibration power generator 10 into direct-current power, and smooths the direct-current power. The rectifying and smoothing circuit 20 includes, for example, a rectifying circuit and a smoothing circuit. The rectifying circuit converts the alternating-current power output from the vibration power generator 10 into direct-current power (usually a pulsating current). The rectifying circuit includes, for example, one or more diodes. For example, a full-wave rectifier including four bridge-connected diodes may be used as the rectifying circuit. The smoothing circuit smooths the direct-current power (pulsating current) output from the rectifying circuit. The smoothing circuit includes, for example, one or more capacitors, or a combination of a capacitor and a coil. The smoothing circuit temporarily integrates the electric current (pulsating current) as an electric charge, and discharges it, thereby smoothing the voltage. That is, the smoothing circuit is a kind of power storage circuit that stores electric power.

The converter 30 includes a switching circuit (also referred to as a switching element), and converts the voltage level of the direct-current power output from the rectifying and smoothing circuit 20 based on a switching operation of the switching circuit. The switching circuit is driven by a pulse signal (square-wave signal) from the pulse signal generating circuit 80. As the switching circuit, a transistor or a metal-oxide-semiconductor field-effect transistor (MOSFET), for example, may be used. The electric power output from the converter 30 is suitably supplied to a given device such as a sensor that is connected to the power generation system 1.

Figure 3B:
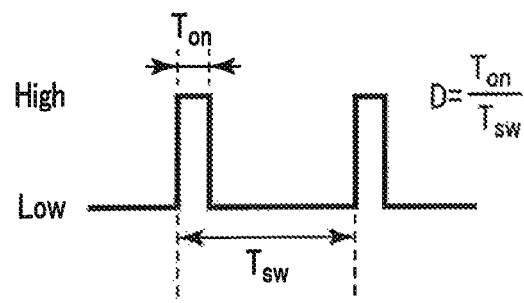
FIG. 3B is a diagram illustrating a switching operation of a switching circuit shown in FIG. 3A.

The converter 30 is, for example, a buck-boost converter. FIG. 3A shows an example of a schematic of the buck-boost converter. As shown in FIG. 3A, the buck-boost converter includes a capacitor 31, a switching circuit 32, a coil 33, and a diode 34. The switching circuit 32 and the diode 34 are connected in series between an input terminal 35A and an output terminal 36A. One end of the capacitor 31 is connected to a connection point between the input terminal 35A and the switching circuit 32, and the other end is connected to a connection point between an input terminal 35B and an output terminal 36B. One end of the coil 33 is connected to a connection point between the switching circuit 32 and the diode 34, and the other end is connected to a connection point between the input terminal 35B and the output terminal 36B. The switching circuit 32 is driven by a pulse signal as shown in FIG. 3B. The switching circuit 32 is turned on when the signal level of the pulse signal is High, and is turned off when the signal level of the pulse signal is Low.

The displacement measuring part 40 measures a displacement of the movable part (the movable part 12 in the example of FIG. 2) of the vibration power generator 10. By way of example, the displacement measuring part 40 measures a displacement of the movable part of the vibration power generator 10 based on an electric signal output from the vibration power generator 10. A method of measuring a displacement of the movable part of the vibration power generator 10 based on an electric signal output from the vibration power generator 10 will be described later. Since a rectifying circuit is typically a non-linear element, a small input voltage to the rectifying circuit causes a significant effect thereon. It is thus preferable to provide a circuit that corrects the non-linearity of the rectifying circuit in the displacement measuring part 40.

In another example, the displacement measuring part 40 measures a displacement of the movable part of the vibration power generator 10 based on an output signal of a sensor provided in the vibration power generator 10. When the vibration power generator 10 has a structure shown in FIG. 2, an acceleration sensor, for example, is attached to the movable part 12 or the elastic member 15, and the displacement measuring part 40 measures a displacement of the movable part 12 by integrating the acceleration measured by the acceleration sensor two times. Furthermore, a strain sensor, for example, is attached to the elastic member 15, and the displacement measuring part 40 converts a strain of the elastic member 15 measured by the strain sensor into a displacement of the movable part 12.

A displacement measuring method based on an electric signal output from the vibration power generator 10 is capable of reducing the power consumption, compared to a displacement measuring method using a sensor. It is therefore desirable to use a displacement measuring method based on an electric signal output from the vibration power generator 10, from the viewpoint of low power consumption. A common filter for removing noise (e.g., a high-pass filter or a low-pass filter) may be provided in the displacement measuring part 40. Furthermore, a coil dedicated to displacement detection may be provided in the vibration power generator 10, in addition to the coil for power generation, in such a manner that a displacement measurement is performed based on an electric signal output from the coil for displacement detection.

The reference output part 50 sets (stores) a reference displacement, and outputs it to the comparator 60. The reference displacement is, for example, a limit value that defines a permissible range of the displacement of the movable part. In the present embodiment, the reference displacement is a positive value. The reference displacement may be a negative value. The reference output part 50 may output two reference displacements, namely, a positive reference displacement and a negative reference displacement. The reference output part 50 may output a voltage corresponding to the reference displacement (hardware output), or output a signal indicative of the reference displacement (software output).

The comparator 60 compares the displacement measured by the displacement measuring part 40 with the reference displacement. The comparator 60 outputs a signal (hereinafter referred to as a trigger signal) to the controller 70 when the measurement displacement becomes equal to or greater than the reference displacement. A comparator that has hysteresis characteristics may be used as the comparator 60.

The controller 70 controls the duty ratio (duty cycle) of the switching circuit included in the converter 30. Specifically, the controller 70 increases the duty ratio upon receipt of a trigger signal from the comparator 60. For example, the controller 70 changes the duty ratio from a value D1 to a value D2, which is greater than the value D1. By way of example, the duty ratio is changed by changing the period during which the switching circuit is turned on ($T_{on}$), while maintaining the switching cycle ($T_{sw}$). The controller 70 outputs a control signal indicative of the change in duty ratio to the pulse signal generating circuit 80. The controller 70 may have a refresh function of changing the duty ratio to the value D1 after a preset period of time has elapsed from the change of the duty ratio to the value D2.

The pulse signal generating circuit 80 generates a pulse signal with the duty ratio controlled by the controller 70, and outputs the pulse signal to the converter 30.

The displacement measuring part 40, the reference output part 50, the comparator 60, the controller 70, and the pulse signal generating circuit 80 can be operated by a smoothing voltage output from the rectifying and smoothing circuit 20. Thus, a battery or the like does not need to be provided in the power generation system 1. A control unit that controls the duty ratio (the part including the displacement measuring part 40, the reference output part 50, the comparator 60, the controller 70, and the pulse signal generating circuit 80 in the present embodiment) may be implemented by hardware, software executed by a processor, or a combination thereof. The same applies to the other embodiments.

Next, a method of measuring a displacement of the movable part of the vibration power generator 10 based on an electric signal output from the Vibration power generator 10 will be explained.

Figure 4:
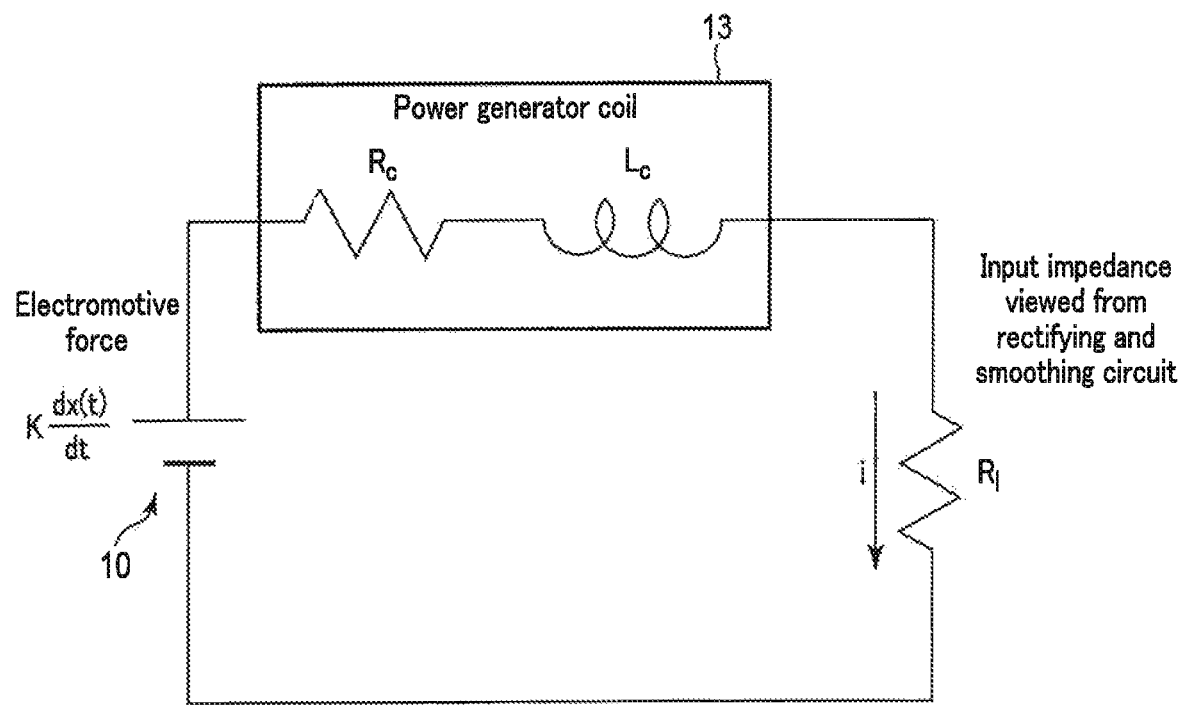
FIG. 4 is a diagram showing an electric circuit of the power generation system shown in FIG. 1.

FIG. 4 shows an electric circuit of the power generation system 1. The electric circuit shown in FIG. 4 satisfies the following equation:

$$L_c \frac{di(t)}{dt} + (R_c + R_l)i(t) = K \frac{dx(t)}{dt} \quad \text{(Equation 1)}$$

Herein, x denotes a displacement of the movable part, K denotes a voltage constant, $L_c$ denotes an inductance of the coil 13 of the vibration power generator 10, $R_c$ denotes a resistance of the coil 13, $R_1$ denotes an equivalent input impedance (of a circuit including the rectifying and smoothing circuit 20, the converter 30, and an external device connected to the power generation system 1) viewed from the rectifying and smoothing circuit 20, and i denotes an output current of the vibration power generator 10.

Performing the Laplace transform of Equation 1 gives the following Equation 2:

$$L_c sI + (R_c + R_l)I = KsX \quad \text{(Equation 2)}$$

Transforming Equation 2 gives Equation 3, which shows the relationship between the displacement of the movable part and the current.

$$X = \frac{L_c sI + (R_c + R_l)I}{Ks} = \frac{L_c}{K}I + \frac{R_c + R_l}{K}\frac{I}{s} \quad \text{(Equation 3)}$$

According to Equation 3, a displacement of the movable part can be calculated by the values of the parameters (K, $L_c$, $R_c$, and $R_1$), the current, and the integral value of the current. When a displacement measurement is performed using Equation 3, the displacement measuring part 40 includes a current meter (current detector) that detects a current output from the vibration power generator 10 and an integrator that integrates the current. The integrator may be implemented as an analog circuit, or may be implemented by digital processing. The displacement measuring part 40 calculates a displacement of the movable part based on the current detected by the current meter and the integral value of the current obtained by the integrator.

Since $V_{in} = R_1 I$ where $V_{in}$ is the input voltage to the electric circuit, Equation 3 can be rewritten as in the following Equation 4:

$$X = \frac{L_c}{K}I + \frac{R_c}{Ks}I + \frac{1}{Ks}V_{in} \quad \text{(Equation 4)}$$

According to Equation 4, a displacement of the movable part can be calculated from the values of the parameters (K, $L_c$, and $R_e$), the current, and the voltage. Equation 4 is effective when $R_1$ is unknown. When a displacement measurement is performed using Equation 4, the displacement measuring part 40 includes a current meter that detects a current output from the vibration power generator 10, and a voltmeter (voltage detector) that detects a voltage output from the vibration power generator 10.

Expressing the current terms of Equation 4 in voltage gives the following Equation 5:

$$X = \frac{L_c}{KR_l}V_{in} + \frac{1}{K}\left(\frac{R_c}{R_l} + 1\right)\frac{V_{in}}{s} \quad \text{(Equation 5)}$$

According to Equation 5, a displacement of the movable part can be calculated from the values of the parameters (K, $L_c$, $R_c$, and $R_1$), the voltage, and the integral value of the voltage. When a displacement measurement is performed using Equation 5, the displacement measuring part 40 includes a voltmeter that detects a voltage output from the vibration power generator 10; and an integrator that integrates the voltage. The integrator may be implemented as an analog circuit, or may be implemented by digital processing. The displacement measuring part 40 calculates a displacement of the movable part based on the voltage detected by the voltmeter and the integral value of the voltage obtained by the integrator. In general, it is easier to measure a voltage than to measure a current. Accordingly, the displacement measurement using Equation 5 is more effective than the displacement measurement using Equation 3 or 4. In the displacement measurement using Equation 5, however, it is necessary that $R_1$ be known.

When the first term of Equation 5 is negligibly small, compared to the second term, a displacement of the movable part can be calculated from the values of the parameters (K, $R_c$, and $R_1$) and the integral value of the voltage.

When the converter 30 is a buck-boost converter, as Shown in FIG. 3A, $R_1$ is expressed by the following Equation 6:

$$R_l = \frac{T_{sw}}{T_{on}^2}L_{dc} = \frac{1}{D^2}\frac{L_{dc}}{T_{sw}} \quad \text{(Equation 6)}$$

Herein, $T_{sw}$ denotes a switching cycle, $T_{on}$ denotes a period during which the switching circuit is turned on, $L_{dc}$ denotes an inductance of a coil for output, and D denotes a duty ratio of the switching circuit (switching operation), as shown in FIGS. 3A and 3B, where $D=T_{on}/T_{sw}$.

Substituting Equation 6 into Equation 5 gives the following Equation 7:

$$X = \frac{L_c T_{sw}}{K L_{dc}}D^2 V_{in} + \frac{1}{K}\left(\frac{R_c T_{sw}}{L_{dc}}D^2 + 1\right)\frac{V_{in}}{s} \quad \text{(Equation 7)}$$

According to Equation 7, a displacement of the movable part can be calculated from the values of the parameters (K, $L_c$, $R_c$, and $L_{dc}$), the voltage, the integral value of the voltage, the switching cycle $T_{sw}$, and the duty ratio D.

Herein, when the first term of Equation 7 is negligibly small, compared to the second term, Equation 7 can be approximately written as in the following Equation 8:

$$X = \frac{1}{K}\left(\frac{R_c T_{sw}}{L_{dc}}D^2 + 1\right)\frac{V_{in}}{s} \quad \text{(Equation 8)}$$

According to Equation 8, even when $R_1$ is unknown, a displacement of the movable part can be calculated from the values of the parameters (K, $R_c$, and $L_{dc}$), the voltage, the integral value of the voltage, the switching cycle $T_{sw}$, and the duty ratio D.

Next, operations of the power generation system 1 will be described.

Figure 5:
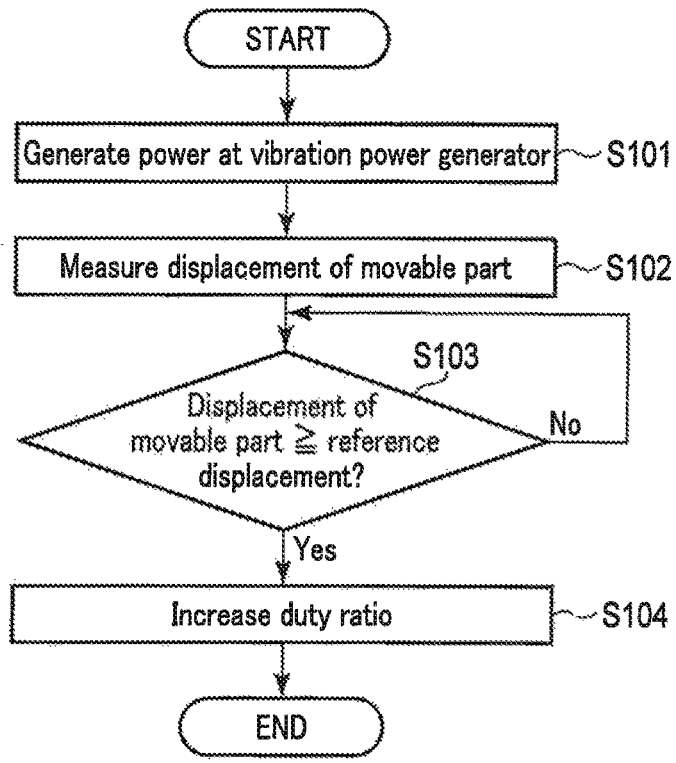
FIG. 5 is a flowchart illustrating an operation procedure of the power generation system shown in FIG. 1.

FIG. 5 shows an operation procedure of the power generation system 1. The operation procedure shown in FIG. 5 is started upon activation of the power generation system 1. For example, an activation switch is arranged between the vibration power generator 10 and the rectifying and smoothing circuit 20, and the power generation system 1 is activated when the activation switch is turned on. The activation switch is not necessarily provided. In that case, it can be considered that the power generation system 1 has been activated when vibrations are applied to the power generation system 1. For example, when the power generation system 1 is installed in a vibration environment, or when vibrations are stopped for a predetermined period of time after the installation and then the vibrations are resumed, it can be regarded that the power generation system 1 has been activated.

In step S101 of FIG. 5, the vibration power generator 10 generates electric power in response to environmental vibration. At the start of power generation, an input impedance $R_1$ viewed from the rectifying and smoothing circuit 20 may be set to a proper impedance $Z_r$ (i.e., an impedance that maximizes the output power of the vibration power generator 10). Specifically, the duty ratio of the switching circuit included in the converter 30 may be set in such a manner that the input impedance $R_1$ viewed from the rectifying and smoothing circuit 20 is a proper impedance $Z_r$.

In step S102, the displacement measuring part 40 measures a displacement of the movable part of the vibration power generator 10. For example, in the case of using Equation 5, the displacement measuring part 40 measures an output voltage of the vibration power generator 10 and an integral value of the output voltage, and calculates a displacement of the movable part based on the measured output voltage and integral value. The processing from steps S101 to S102 will be continued in the subsequent steps.

In step S103, the comparator 60 compares the measurement displacement x with a reference displacement $x_r$. When the measurement displacement x reaches the reference displacement $x_r$, the processing advances to step S104. At this time, the comparator 60 outputs, to the controller 70, a trigger signal indicating that the measurement displacement x becomes equal to or greater than the reference displacement $x_r$.

In step S104, the controller 70 increases the duty ratio of the switching circuit included in the converter 30, in response to receipt of the trigger signal from the comparator 60. This decreases the input impedance $R_1$ viewed from the rectifying and smoothing circuit 20, and increases the current. Accordingly, a braking force generated by the current that acts on the movable part increases, thereby decreasing the displacement amplitude of the movable part.

Figure 6:
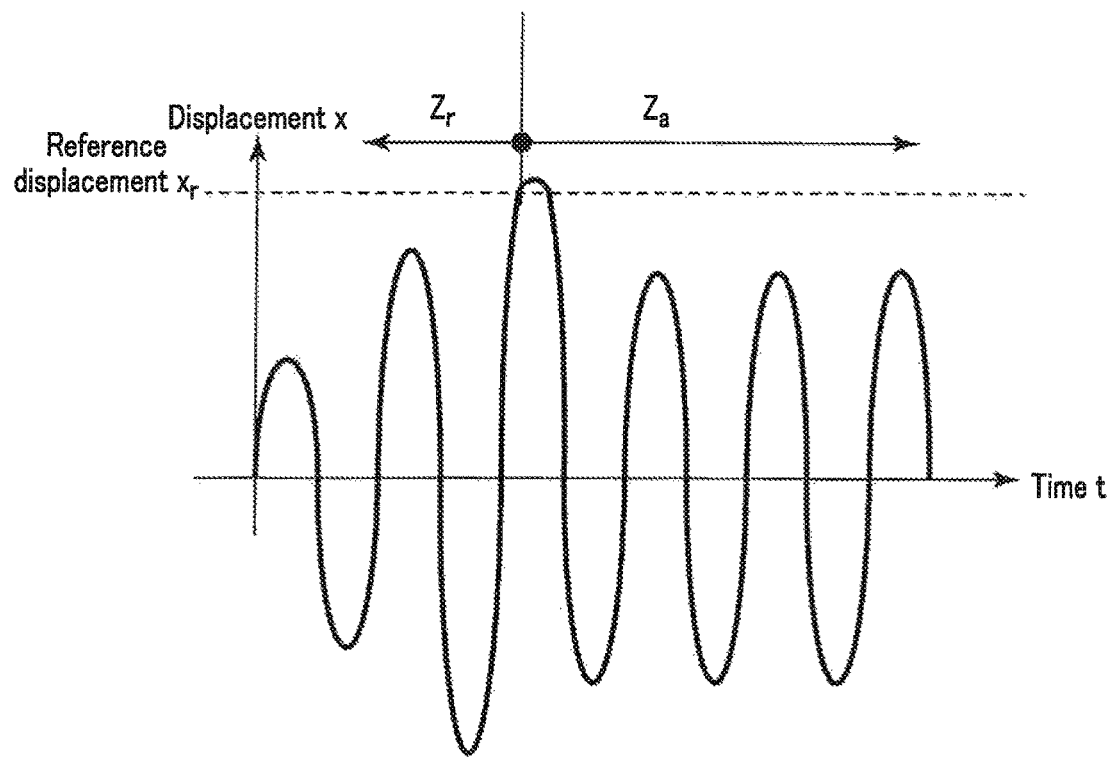
FIG. 6 is a diagram showing a relationship between a displacement of a movable part, a reference displacement, and an impedance according to the first embodiment.

FIG. 6 shows a time change of the displacement of the movable part included in the vibration power generator 10. As shown in FIG. 6, the displacement amplitude of the movable part gradually increases when an input of environmental vibration is started. When the displacement of the movable part reaches the reference displacement $x_r$, the duty ratio is increased, and the input impedance $R_1$ viewed from the rectifying and smoothing circuit 20 is reduced from $Z_r$ to $Z_a$ ($Z_a < Z_r$). Consequently, the displacement amplitude of the movable part is suppressed. When the displacement of the movable part reaches the reference displacement $x_r$ again after the above-described control, the duty ratio may be further increased.

As described above, in the power generation system 1 according to the first embodiment, the duty ratio of the switching circuit included in the converter 30 is increased when the displacement of the movable part included in the vibration power generator 10 becomes equal to or greater than the reference displacement. This decreases the input impedance $R_1$ viewed from the rectifying and smoothing circuit 20, allowing the current to flow smoothly. Accordingly, the braking force generated by the current strongly acts on the movable part, thereby suppressing the displacement amplitude of the movable part. Consequently, it is possible to avoid an excessive displacement of the movable part. For example, it is possible to prevent collision of the movable part 12 with the case 11.

[Modification of First Embodiment]

Figure 7:
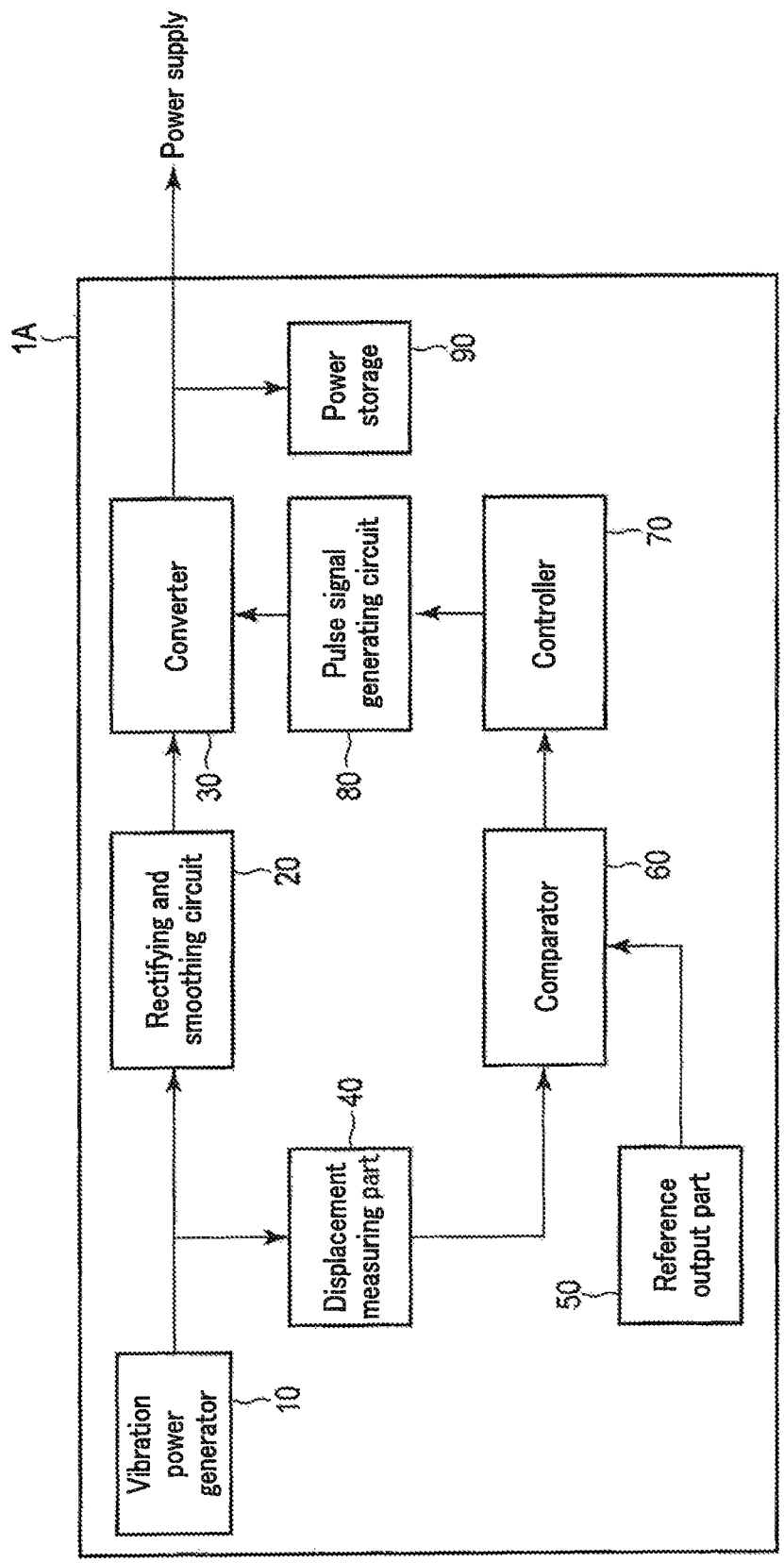
FIG. 7 is a block diagram showing a power generation system according to a modification of the first embodiment.

FIG. 7 illustrates a power generation system 1A according to a modification of the first embodiment. As shown in FIG. 7, the power generation system 1A includes a vibration power generator 10, a rectifying and smoothing circuit 20, a converter 30, a displacement measuring part 40, a reference output part 50, a comparator 60, a controller 70, a pulse signal generating circuit 80, and a power storage 90. The power generation system 1A is different from the power generation system 1 according to the first embodiment (FIG. 1) in that the power storage 90 is further provided.

The power storage 90 is provided at a subsequent stage of the converter 30. The power storage 90 includes, for example, one or more capacitors, a combination of a capacitor and a coil, or a secondary battery. It is preferable that the capacitor has an initial voltage. For example, a lithium-ion capacitor may be used. When the power storage 90 has a large capacity and has an initial voltage, the output voltage is stable and the period decreases during which the operation of the vibration power generator 10 is in a transient state. This decreases the time taken to reach a steady state. Consequently, an increase in average power generation amount can be expected.

The power storage 90 may be provided in a power generation system according to the embodiments that will be described later.

[Second Embodiment]

FIG. 8 shows a power generation system 2 according to the second embodiment. As shown in FIG. 8, the power generation system 2 includes a vibration power generator 10, a rectifying and smoothing circuit 20, a converter 30, a displacement measuring part 40, an absolute value circuit 42, a reference output part 50, a comparator 62, a controller 72, and a pulse signal generating circuit 80. The power generation system 2 is different from the power generation system 1 (FIG. 1) according to the first embodiment in that the absolute value circuit 42 is further provided, that the comparator 60 is changed to the comparator 62, and that the controller 70 is changed to the controller 72.

The absolute value circuit 42 calculates an absolute value of a displacement measured by the displacement measuring part 40. Hereinafter, the absolute value of the displacement may be referred to as a displacement absolute value. The absolute value circuit 42 may be implemented as an analog circuit, or may be implemented by digital processing. The absolute value circuit 42 may include a low-pass filter such as a resistor-capacitor (RC) filter, or have a peak hold function. If the absolute value circuit 42 includes a low-pass filter, the waveform envelope of the displacement absolute value is obtained.

The comparator 62 compares the displacement absolute value measured by the displacement measuring part 40 with the reference displacement. As an example, the comparator 62 outputs a first trigger signal to the controller 72 when the displacement absolute value becomes equal to or greater than the reference displacement, and outputs a second trigger signal to the controller 72 when the displacement absolute value becomes less than the reference displacement. In another example, the comparator 62 does not output a signal while the displacement absolute value is less than the reference displacement, and outputs a signal while the displacement absolute value is equal to or greater than the reference displacement. A comparator that has hysteresis characteristics may be used as the comparator 62.

The controller 72 controls the duty ratio of the switching circuit included in the converter 30 based on the output signal of the comparator 62. For example, the controller 72 adjusts the duty ratio to the value D1 when the displacement absolute value is less than the reference displacement, and adjusts the value D2 (D2>D1) when the displacement absolute value is equal to or greater than the reference displacement.

Figure 9:
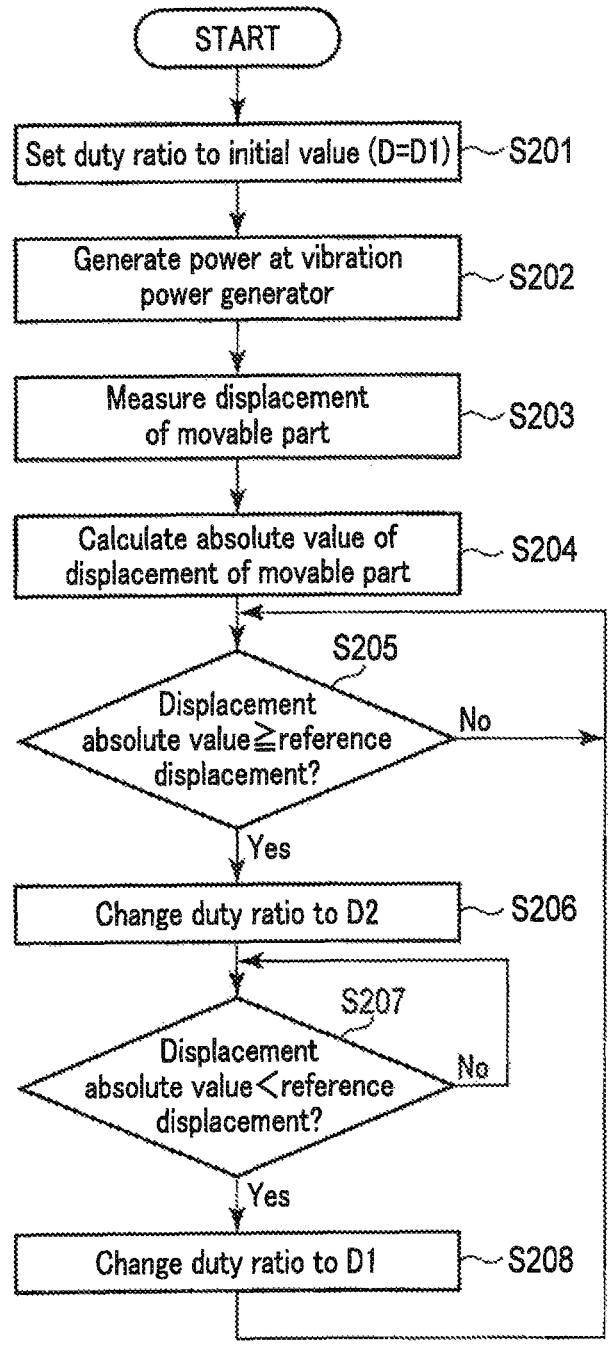
FIG. 9 is a flowchart illustrating an operation procedure of the power generation system shown in FIG. 8.

FIG. 9 shows an operation procedure of the power generation system 2. In step S201 of FIG. 9, the controller 72 sets the duty ratio of the switching circuit included in the converter 30 to the initial value D1. In step S202, the vibration power generator 10 generates electric power in response to the environmental vibration. At the start of power generation, a displacement absolute value $x_a$ is less than the reference displacement $x_r$. Accordingly, the initial value of the duty ratio is set to the value D1. The value D1 is determined in such a manner, for example, that the input impedance $R_1$ viewed from the rectifying and smoothing circuit 20 is a proper impedance $Z_r$.

In step S203, the displacement measuring part 40 measures a displacement of the movable part of the vibration power generator 10. In step S204, the absolute value circuit 42 calculates an absolute value of the displacement measured by the displacement measuring part 40.

In step S205, the comparator 62 compares the displacement absolute value $x_a$ with the reference displacement $x_r$. When the displacement absolute value $x_a$ reaches the reference displacement $x_r$, the processing advances to step S205.

In step S206, the controller 72 changes the duty ratio from the value D1 to the value D2. This decreases the input impedance $R_1$ viewed from the rectifying and smoothing circuit 20, allowing the current to flow smoothly. Accordingly, the braking force generated by the current that acts on the movable part increases, thereby suppressing the displacement of the movable part.

In step S206, the comparator 62 compares the displacement absolute value $x_a$ with the reference displacement $x_r$. When the displacement absolute value $x_a$ falls below the reference displacement $x_r$, the processing advances to step S207.

In step S207, the controller 72 changes the duty ratio from the value D2 back to the value D1. This increases the input impedance $R_1$ viewed from the rectifying and smoothing circuit 20, preventing the current from flowing smoothly. Accordingly, the braking force generated by the current that acts on the movable part decreases.

Figure 10A:
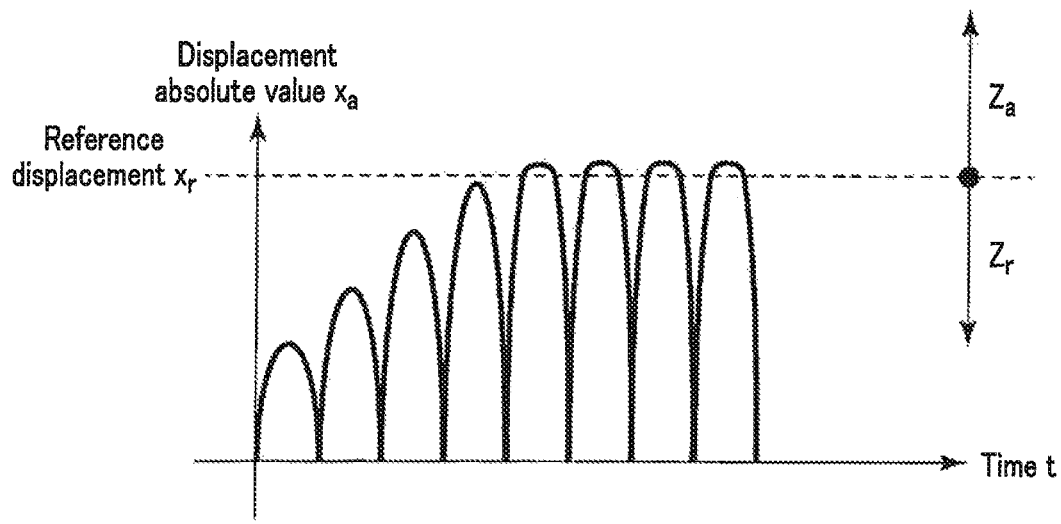
FIG. 10A is a diagram showing a relationship between an absolute value of a displacement, a reference displacement, and an impedance according to the second embodiment.
Figure 10B:
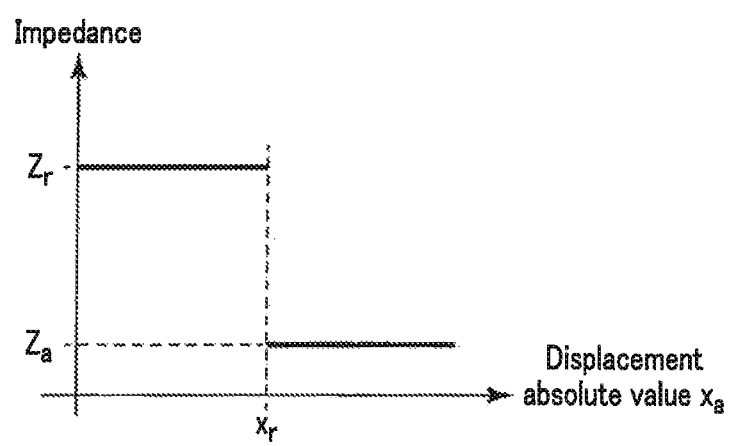
FIG. 10B is a diagram showing a relationship between an absolute value of a displacement and an impedance according to the second embodiment.

Thus, the duty ratio is set to the value D1 while the displacement absolute value $x_a$ is less than the reference displacement $x_r$, and the duty ratio is set to the value D2 (D2>D1) while the displacement absolute value $x_a$ is equal to or greater than the reference displacement $x_r$. In other words, as shown in FIGS. 10A and 10B, the impedance is set to the value $Z_r$ while the displacement absolute value $x_a$ is less than the reference displacement $x_r$, and is set to the value $Z_a$ ($Z_a<Z_r$) while the displacement absolute value $x_a$ is equal to or greater than the reference displacement $x_r$.

As described above, in the power generation system 2 according to the second embodiment, the duty ratio is set to the value D1 during the period in which the displacement absolute value $x_a$ is less than the reference displacement $x_r$, and is set to the value D2 (D2>D1) during the period in which the displacement absolute value $x_a$ is equal to or greater than the reference displacement $x_r$. Accordingly, when the displacement absolute value $x_a$ is the reference displacement $x_r$, the input impedance $R_1$ viewed from the rectifying and smoothing circuit 20 decreases, allowing the current to flow smoothly. Accordingly, the braking force generated by the current strongly acts on the movable part, thereby suppressing the displacement of the movable part. Consequently, it is possible to avoid an excessive displacement of the movable part.

A threshold value that is used to change the duty ratio from the value D1 to the value D2 may be different from the threshold value that is used to change the duty ratio from the value D2 to the value D1. For example, the comparator 62 may compare the displacement absolute value $x_a$ with a reference displacement $x_{r2}$ at step S204, and compare the displacement absolute value $x_a$ with a reference displacement $x_{r1}$ at step S206, where $x_{r2} > x_{r1}$.

[Modifications of Second Embodiment]

A case will be explained where the power generation system 2 performs a displacement measurement based on Equation 7. In Equation 7, $L_c$, K, T, $R_c$, $L_{dc}$, and $T_{sw}$ are constants, and D is a variable.

Figure 11:
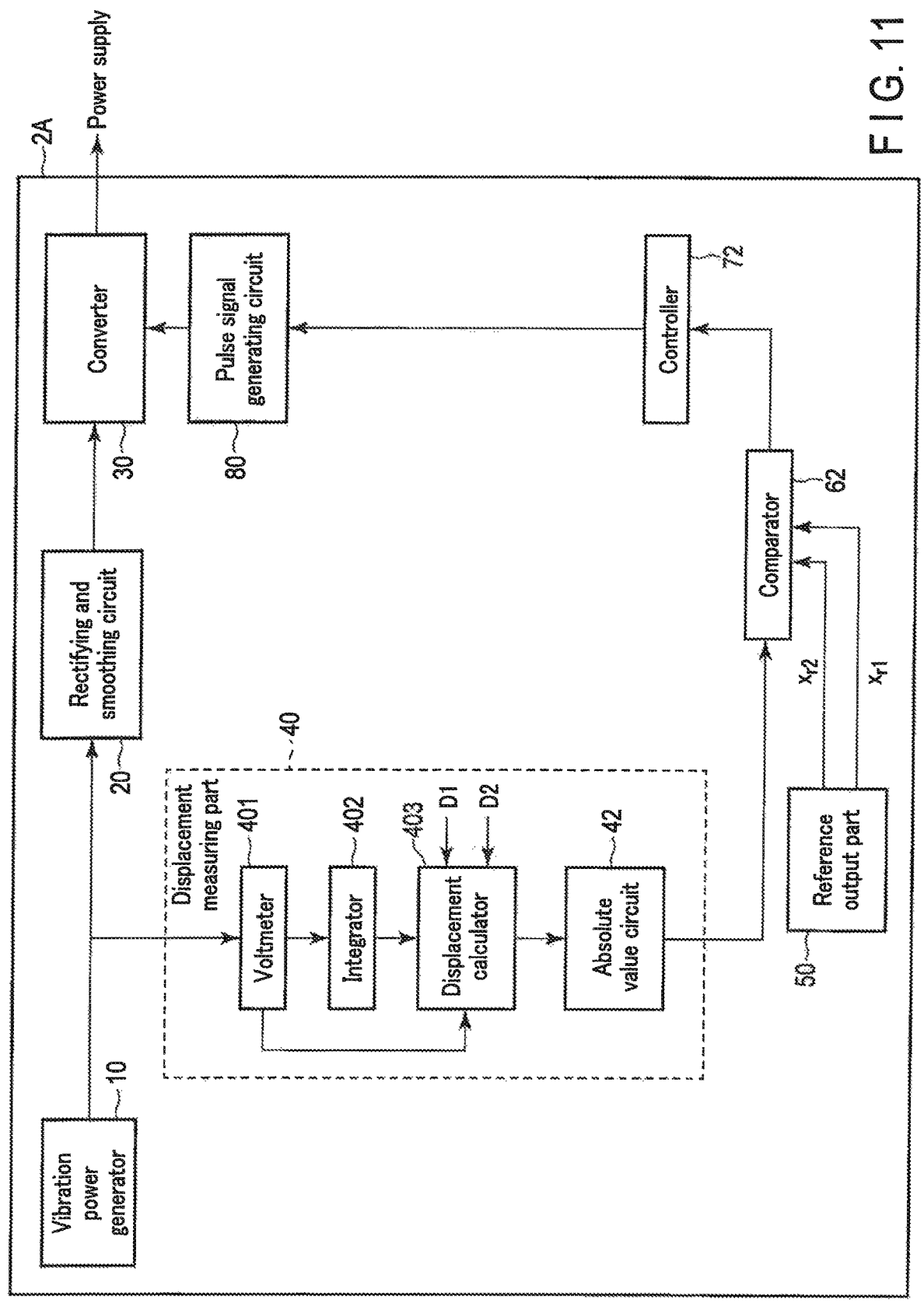
FIG. 11 is a block diagram showing a power generation system according to a modification of the second embodiment.

FIG. 11 shows a power generation system 2A according to a modification of the second embodiment. In the power generation system 2A shown in FIG. 11, the displacement measuring part 40 includes a voltmeter 401, an integrator 402, a displacement calculator 403, and an absolute value circuit 42.

The voltmeter 401 measures an output voltage of the vibration power generator 10. The integrator 402 integrates the output voltage of the vibration power generator 10.

The displacement calculator 403 holds values D1 and D2 as the duty ratio D, and calculates a displacement of the movable part in accordance with Equation 7. Specifically, the displacement calculator 403 calculates a displacement of the movable part based on a voltage value output from the voltmeter 401, a voltage integral value output from the integrator 402, and the duty ratio D1 or D2 held in the displacement calculator 403. The displacement calculator 403 includes, for example, an addition circuit, which adds the product of the voltage value output from the voltmeter multiplied by the coefficient of the first term of Equation 7 to the product of the voltage integral value output from the integrator 402 multiplied by the coefficient of the second term of Equation 7. The absolute value circuit 42 calculates an absolute value of the displacement calculated by the displacement calculator 403.

Figure 12:
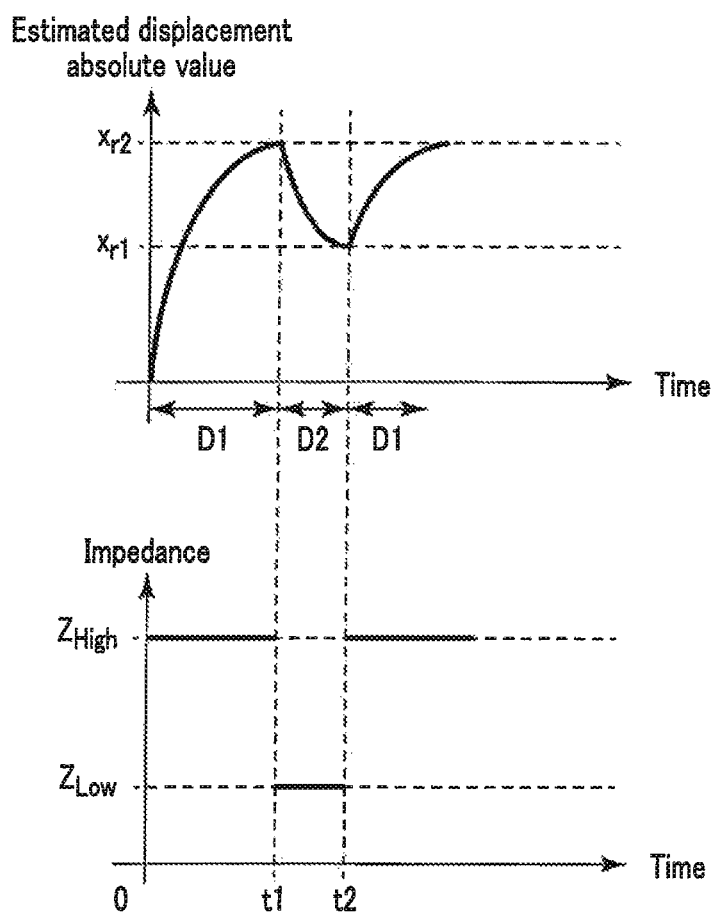
FIG. 12 is a diagram illustrating an operation of the power generation system shown in FIG. 11.

The reference output part 50 outputs two reference displacements $x_{r1}$ and $x_{r2}$ to the comparator 62, where $x_{r1} < x_{r2}$. The comparator 62 compares the displacement absolute value received from the absolute value circuit 42 with the reference displacements $x_{r1}$ and $x_{r2}$. When the displacement absolute value reaches the reference displacement $x_{r2}$ in a state in which the duty ratio is set to the value D1, the controller 72 changes the duty ratio from the value D1 to the value D2. When the displacement absolute value falls below the reference displacement $x_{r1}$ in a state in which the duty ratio is set to the value D2, the controller 72 changes the duty ratio from the value D2 to the value D1. In this case, $x_{r1}$ may be equal to $x_{r2}$. Operations of the power generation system 2A will be explained with reference to FIG. 12. In this case, the absolute value circuit 42 includes a low-pass filter, by which the waveform envelope of the displacement absolute value is obtained. At the time of activation of the power generation system 2A, the duty ratio is set to the value D1. At this time, the impedance is $Z_{High}$. Accordingly, the displacement absolute value that is calculated, based on the duty ratio D1, by an estimation circuit that includes the displacement calculator 403 and the absolute value circuit 42 is supplied to the comparator 62.

When the displacement absolute value gradually increases and reaches the reference displacement $x_{r2}$ (t=t1), the controller 72 changes the duty ratio from the value D1 to the value D2. Thereby, the impedance becomes $Z_{Low}$ ($Z_{Low} < Z_{High}$) Accordingly, the displacement absolute value calculated by the estimation circuit based on the duty ratio D2 is supplied to the comparator 62.

Thereafter, when the displacement absolute value gradually decreases and falls below the reference displacement $x_{r1}$ (t=t2), the controller 72 changes the duty ratio from the value D2 to the value D1. Thereby, the impedance becomes $Z_{High}$. Accordingly, the displacement absolute value calculated by the estimation circuit based on the duty ratio D1 is supplied to the comparator 62.

Figure 13:
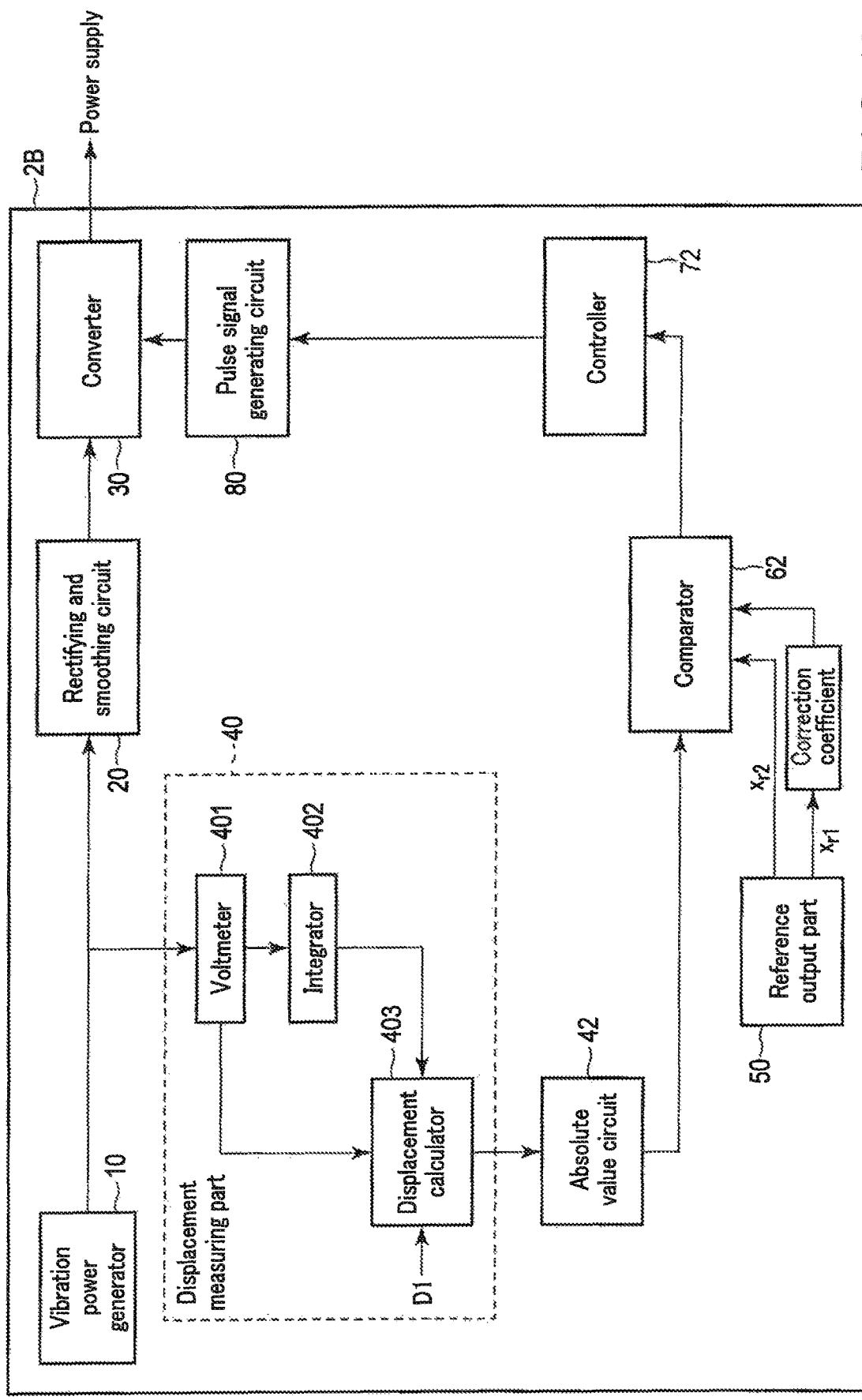
FIG. 13 is a block diagram showing a power generation system according to another modification of the second embodiment.
Figure 14:
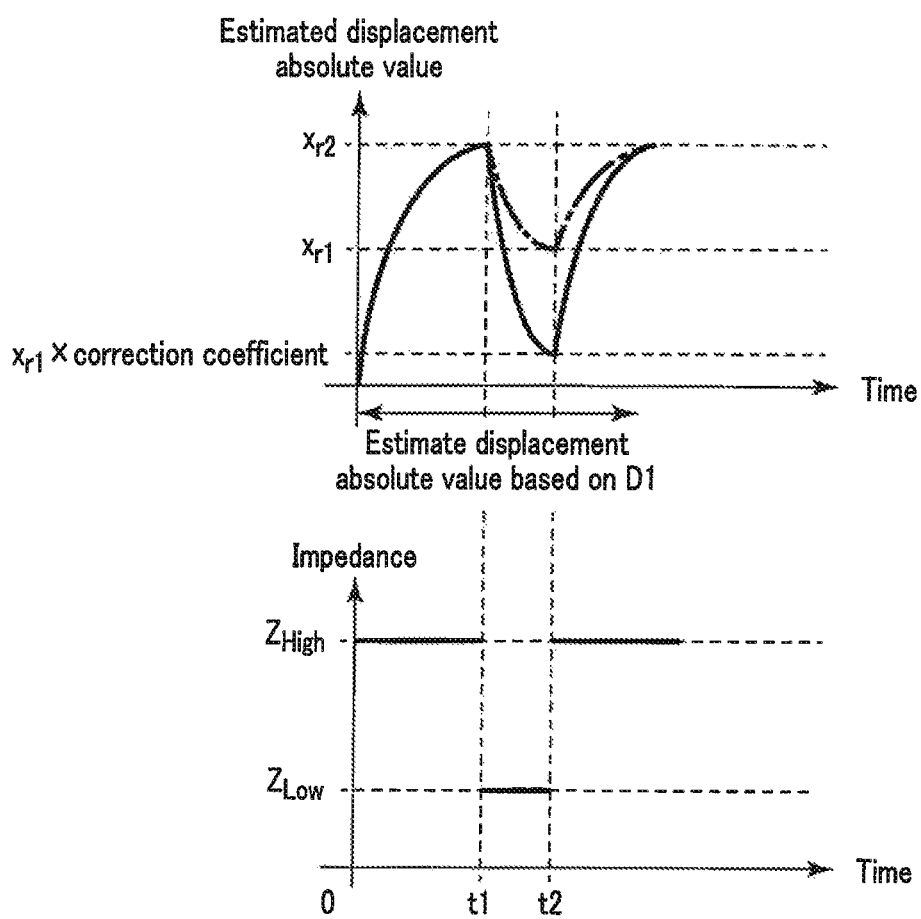
FIG. 14 is a diagram illustrating an operation of the power generation system shown in FIG. 13.

FIG. 13 shows a power generation system 2B according to another modification of the second embodiment. In the power generation system 2B shown in FIG. 13, the displacement measuring part 40 includes a voltmeter 401, an integrator 402, and a displacement calculator 403. The displacement calculator 403 holds a value D1 as the duty ratio, and calculates a displacement of the movable part in accordance with Equation 7. In the power generation system 2B, a displacement absolute value is calculated based on the value D1 during the period in which the duty ratio is set to the value D2, as well as the period in which the duty ratio is set to the value D1. As shown in FIG. 14, during the period in which the duty ratio is set to the value D2, the displacement absolute value calculated using the value D1 is different from the displacement absolute value calculated using the value D2. In FIG. 14, the displacement absolute value calculated using the value D1 is indicated by the solid line, and the displacement absolute value calculated using the value D2 is indicated by the dash-dotted line. Accordingly, the above-described product of the reference displacement $x_{r1}$ multiplied by the correction coefficient is used as the reference displacement used to change the duty ratio from the value D2 to the value D1.

As described above, the displacement measuring part 40 according the modifications of the second embodiment is capable of measuring a displacement of the movable part based on the output voltage from the vibration power generator 10, without using an external sensor. It is thereby possible to reduce the electric power required for displacement measurement, and to thereby achieve lower power consumption of the overall system.

[Third Embodiment]

Figure 15:
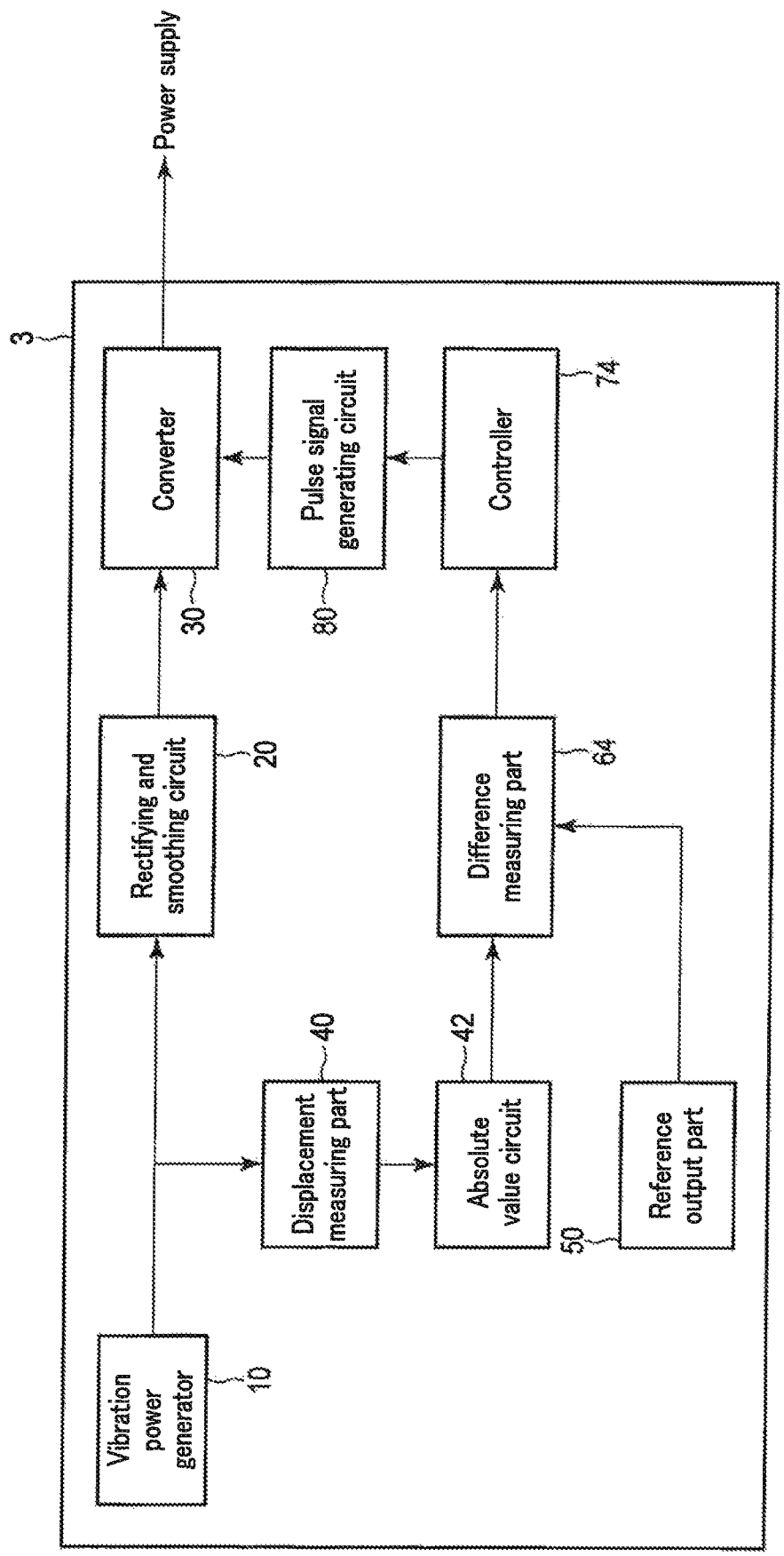
FIG. 15 is a block diagram showing a power generation system according to a third embodiment.

FIG. 15 shows a power generation system 3 according to the third embodiment. As shown in FIG. 15, the power generation system 3 includes a vibration power generator 10, a rectifying and smoothing circuit 20, a converter 30, a displacement measuring part 40, an absolute value circuit 42, a reference output part 50, a difference measuring part 64, a controller 74, and a pulse signal generating circuit 80. The power generation system 3 is different from the power generation system 1 (FIG. 1) according to the first embodiment in that the comparator 60 is changed to the difference measuring part 64, and that the controller 70 is changed to the controller 74. Since the absolute value circuit 42 is the same as that of the second embodiment, an explanation about the absolute value circuit 42 will be omitted.

The difference measuring part 64 calculates a difference between the displacement absolute value output from the absolute value circuit 42 and the reference displacement. The difference measuring part 64 includes, for example, a subtraction circuit, which obtains a difference by subtracting the reference displacement from the displacement absolute value. The difference measuring part 64 may obtain a difference by subtracting the displacement absolute value from the reference displacement.

The controller 74 controls the duty ratio based on the difference calculated by the difference measuring part 64. Specifically, the controller 74 sets the duty ratio to a predetermined value during the period in which the difference is less than zero (i.e., the displacement absolute value is less than the reference displacement), and changes the duty ratio to make the difference zero during the period in which the difference is equal to or greater than zero. For example, the controller 74 increases the duty ratio as the difference increases (i.e., the displacement absolute value increases).

Figure 16:
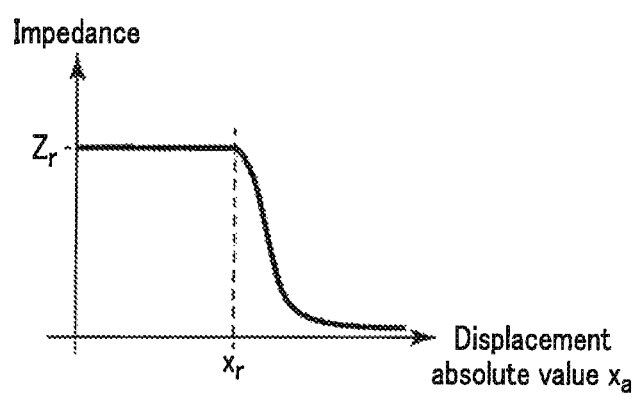
FIG. 16 is a diagram illustrating a relationship between an absolute value of a displacement, a reference displacement, and an impedance according to the third embodiment.

Thereby, as shown in FIG. 16, the impedance is set to a proper impedance $Z_r$ when the displacement absolute value $x_a$ is less than the reference displacement $x_r$, and the impedance is set so as to decrease as the difference increases when the displacement absolute value $x_a$ is equal to or greater than the reference displacement $x_r$.

A common controller for feedback control (e.g., a proportional (P) controller, a proportional-integral (PI) controller, or a proportional-integral-differential (PID) controller), for example, may be used as the controller 74. To avoid the case where the output from the controller becomes zero at the moment when the displacement absolute value becomes equal to the reference displacement, the controller 74 may have an offset.

As described above, in the power generation system 3 according to the third embodiment, the duty ratio is controlled so as to make the difference zero when the difference between the displacement absolute value and the reference displacement is equal to or greater than zero. It is thereby possible to obtain the similar effect as can be obtained by the first embodiment.

[Modification of Third Embodiment]

A case will be explained where the power generation system 3 according to the third embodiment performs a displacement measurement in accordance with Equation 7.

Figure 17:
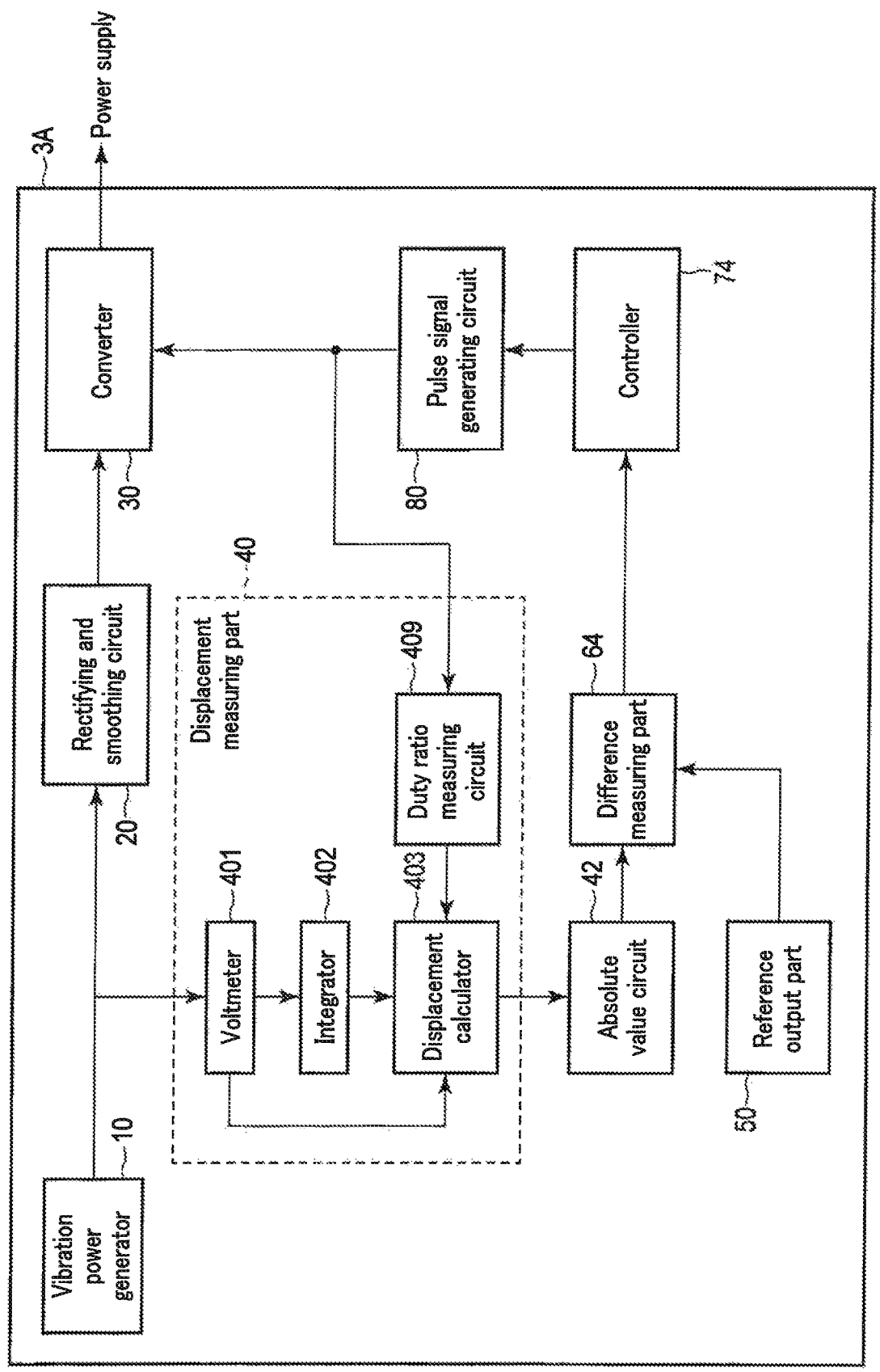
FIG. 17 is a block diagram showing a power generation system according to a modification of the third embodiment.

FIG. 17 shows a power generation system 3A according to a modification of the third embodiment. In the power generation system 3A shown in FIG. 17, the displacement measuring part 40 includes a voltmeter 401, an integrator 402, a displacement calculator 403, and a duty ratio measuring circuit 409.

The voltmeter 401 measures an output voltage of the vibration power generator 10. The integrator 402 calculates an integral value of the output voltage of the vibration power generator 10. The duty ratio measuring circuit 409 measures a duty ratio of a switching circuit. Specifically, the duty ratio measuring circuit 409, which holds a switching cycle ($T_{sw}$), detects a period ($T_{on}$) during which the signal level of a pulse signal output from a pulse signal generating circuit 80 is high, and calculates the duty ratio by dividing the measured period by the switching cycle. The displacement calculator 403 calculates a displacement of the movable part based on the voltage measured by the voltmeter 401, the integral value of the voltage obtained by the integrator 402, and the duty ratio measured by the duty ratio measuring circuit 409.

The duty ratio measuring circuit 409 does not need to be provided. In that case, the displacement calculator 403 receives information indicative of a setting value of the duty ratio from the controller 74, and calculates a displacement of the movable part based on the information.

As described above, the displacement measuring part 40 according to the modification of the third embodiment is capable of measuring a displacement of the movable part based on the output voltage of the vibration power generator 10, without using an external sensor. It is thereby possible to reduce the electric power required for displacement measurement, and to thereby achieve lower power consumption of the overall system.

[Fourth Embodiment]

FIG. 18 shows a power generation system 4 according to the fourth embodiment. As shown in FIG. 18, the power generation system 4 includes a vibration power generator 10, a rectifying and smoothing circuit 20, a converter 30, a displacement measuring part 40, an absolute value circuit 42, a reference output part 50, a difference measuring part 64, a controller 76, a pulse signal generating circuit 80, and a power measuring part 92. The power generation system 4 according to the fourth embodiment is different from the power generation system 3 (FIG. 15) according to the third embodiment in that the power measuring part 92 is further provided, and that the controller 74 is changed to the controller 76.

When the environmental vibration is unsteady, the proper impedance $Z_r$ is not uniquely determined, and changes from moment to moment. Accordingly, if the duty ratio were fixed to the value D1 during the period in which the displacement absolute value is less than the reference displacement, as in the first to third embodiments, the power generation efficiency might decrease. In the present embodiment, the duty ratio is adaptively controlled to maximize the electric power, during the period in which the displacement absolute value is less than the reference displacement.

Figure 19:
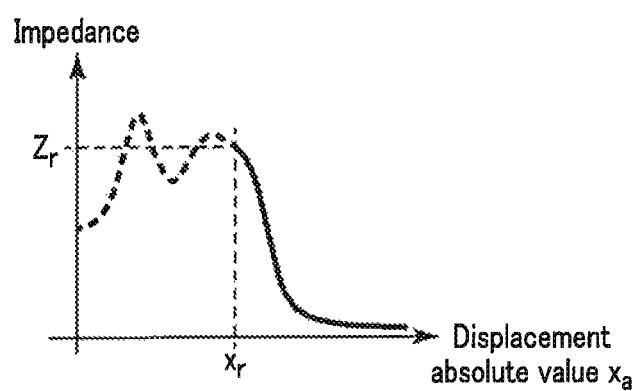
FIG. 19 is a diagram showing a relationship between an absolute value of a displacement and an impedance according to the fourth embodiment.

The power measuring part 92 measures electric power output from the vibration power generator 10. The controller 76 controls the duty ratio based on the electric power measured by the power measuring part 92 during the period in which the displacement absolute value is less than the reference displacement. For example, the controller 76 changes the duty ratio to maximize the electric power output from the vibration power generator 10. Thereby, the impedance changes in accordance with the change in duty ratio, as shown in FIG. 19. A common technique such as maximum power point tracking (MDPT) may be used as the algorithm for maximizing the electric power. During the period in which the displacement absolute value is equal to or greater than the reference displacement, the controller 76 controls the duty ratio so as to reduce the difference obtained by the difference measuring part 64, in a manner similar to the controller 74 (FIG. 15) according to the third embodiment.

In the fourth embodiment, it is possible to achieve both maximization of the generated electric power at a low vibration amplitude and suppression of displacement of the movable part at a high vibration amplitude, even when the environmental vibration is unsteady.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power generation system comprising:
   a power generator that includes a movable part and a stationary part, the stationary part supporting the moving part and converting mechanical energy of the movable part into alternating-current electric power;
   a displacement measuring part that measures a displacement of the movable part;
   a controller that determines a duty ratio as a function of the measured displacement and outputs a control signal indicative of a change in the duty ratio;
   a pulse signal generating circuit that receives the control signal, generates a pulse signal with the duty ratio controlled by the controller, and outputs the pulse signal;
   a rectifying circuit that converts the alternating-current electric power output from the power generator into direct-current electric power; and a converter that includes a switching circuit whose duty ratio is controlled by the pulse signal, and that converts a voltage level of the direct-current electric power output from the rectifying circuit, the voltage-converted direct-current electric power to be supplied to an external device.

2. The power generation system according to claim 1, further comprising:
a comparator that compares the measured displacement with a reference displacement, wherein
the duty ratio is increased in response to the measured displacement becoming equal to or greater than the reference displacement.

3. The power generation system according to claim 1, further comprising:
an absolute value circuit that calculates an absolute value of the measured displacement; and
a comparator that compares the absolute value with a reference displacement, wherein
the duty ratio is set to a first value when the absolute value is less than the reference displacement, and is set to a second value when the absolute value is equal to or greater than the reference displacement, the second value being greater than the first value.

4. The power generation system according to claim 1, further comprising:
an absolute value circuit that calculates an absolute value of the measured displacement; and
a comparator that compares the absolute value with a first reference displacement and a second reference displacement, the second reference displacement being greater than the first reference displacement, wherein
the duty ratio is set to a second value in response to the absolute value becoming equal to or greater than the second reference displacement, and is set to a first value in response to the absolute value becoming less than the first reference displacement, the first value being less than the second value.

5. The power generation system according to claim 1, further comprising:
an absolute value circuit that calculates an absolute value of the measured displacement; and
a difference measuring part that measures a difference between the absolute value and a reference displacement, wherein the duty ratio is adjusted by P, PI, or PID control to reduce the difference.

6. The power generation system according to claim 5, further comprising:
a power measuring part that measures the alternating-current electric power output from the power generator, wherein the duty ratio is controlled as a function of the measured alternating-current electric power when the absolute value is less than the reference displacement, and is adjusted to reduce the difference when the absolute value is equal to or greater than the reference displacement.

7. The power generation system according to claim 1, wherein the displacement measuring part measures the displacement of the movable part as a function of an output current of the power generator and an integral value of the output current.

8. The power generation system according to claim 1, wherein the displacement measuring part measures the displacement of the movable part as a function of an output current of the power generator, an integral value of the output current, and an output voltage of the power generator.

9. The power generation system according to claim 1, wherein the displacement measuring part measures the displacement of the movable part as a function of an integral value of an output voltage of the power generator.

10. The power generation system according to claim 1, wherein the displacement measuring part measures the displacement of the movable part as a function of an output voltage of the power generator and an integral value of the output voltage.

11. The power generation system according to claim 1, wherein the displacement measuring part measures the displacement of the movable part as a function of an output voltage of the power generator, an integral value of the output voltage, and the duty ratio.

12. The power generation system according to claim 1, wherein the displacement measuring part measures the displacement of the movable part as a function of an integral value of an output voltage of the power generator and the duty ratio.

13. The power generation system according to claim 1, wherein the converter comprises a buck-boost converter.

14. The power generation system according to claim 1, further comprising:
a power storage that stores the voltage-converted direct-current electric power.

15. The power generation system according to claim 14, wherein the power storage comprises a capacitor.

16. The power generation system according to claim 15, wherein the capacitor has an initial voltage.

17. The power generation system according to claim 14, wherein the power storage comprises a secondary battery.

* * * * *